US012792366B2

(12) United States Patent
Tamayo

(10) Patent No.: US 12,792,366 B2
(45) Date of Patent: Nov. 10, 2026

(54) WEB EXPERIENCE ENHANCEMENT USING INACTIVE BROWSER TABS

(71) Applicant: Capital One Services, LLC, McLean, VA (US)

(72) Inventor: Bryan Tamayo, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 404 days.

(21) Appl. No.: 18/613,456

(22) Filed: Mar. 22, 2024

(65) Prior Publication Data

US 2025/0298639 A1 Sep. 25, 2025

(51) Int. Cl.
*G06F 9/451* (2018.01)
*G06F 9/54* (2006.01)

(52) U.S. Cl.
CPC .............. *G06F 9/451* (2018.02); *G06F 9/547* (2013.01)

(58) Field of Classification Search
CPC ................................. G06F 9/451; G06F 9/547
See application file for complete search history.

(56) References Cited

U.S. PATENT DOCUMENTS 9,342,208 B2 5/2016 Howes et al.
9,921,720 B2 3/2018 Law et al.
10,838,614 B2 11/2020 Storr et al.
2010/0287562 A1* 11/2010 Jazdzewski ........... G06F 11/362 717/124
2018/0322216 A1* 11/2018 Vaidya .................... G06F 9/451
2025/0077611 A1* 3/2025 Balko ................... G06F 21/128

OTHER PUBLICATIONS

MDN contributors, "Broadcast Channel API," MDN web docs (2023), retrieved from https://developer.mozilla.org/en-US/docs/Web/API/Broadcast_Channel_API, 3 pages.

* cited by examiner

*Primary Examiner* — Wissam Rashid
(74) *Attorney, Agent, or Firm* — Harrity & Harrity, LLP

(57) ABSTRACT

In some implementations, a user device may create a broadcast channel in response to a command from a first process associated with a first browser tab. The user device may connect the broadcast channel to a second browser tab in response to a request from a second process associated with the second browser tab. The user device may receive, from a web server, a webpage for the first browser tab. The user device may transmit, to the web server, an indication that the second browser tab is inactive. The user device may receive, from the web server and in response to the indication, supplemental content associated with the webpage. The user device may transmit, via the broadcast channel and to the second process, an indication of the supplemental content. The user device may load, in the second browser tab and using the second process, the supplemental content.

20 Claims, 10 Drawing Sheets

WEB EXPERIENCE ENHANCEMENT USING INACTIVE BROWSER TABS

BACKGROUND

Modern web browsers, such as Microsoft Edge®, Mozilla Firefox®, or Google Chrome®, among other examples, often allow a user to open multiple browser tabs. For example, the user may view multiple webpages simultaneously across the browser tabs.

SUMMARY

Some implementations described herein relate to a system for using one or more inactive browser tabs. The system may include one or more memories and one or more processors communicatively coupled to the one or more memories. The one or more processors may be configured to create a broadcast channel in response to a command from a first process associated with a first browser tab. The one or more processors may be configured to connect the broadcast channel to a second browser tab in response to a request from a second process associated with the second browser tab. The one or more processors may be configured to load, in the first browser tab and using the first process, a webpage. The one or more processors may be configured to determine that the second browser tab is associated with an inactive status and is at least partially visible. The one or more processors may be configured to transmit, from the first process and to the broadcast channel, an indication of supplemental content associated with the webpage. The one or more processors may be configured to load, in the second browser tab and using the second process, the supplemental content.

Some implementations described herein relate to a method of using one or more inactive browser tabs. The method may include creating, by a user device, a broadcast channel in response to a command from a first process associated with a first browser tab. The method may include connecting, by the user device, the broadcast channel to a second browser tab in response to a request from a second process associated with the second browser tab. The method may include receiving, from a web server, a webpage for the first browser tab. The method may include transmitting, to the web server, an indication that the second browser tab is inactive. The method may include receiving, from the web server and in response to the indication, supplemental content associated with the webpage. The method may include transmitting, via the broadcast channel and to the second process, an indication of the supplemental content. The method may include loading, in the second browser tab and using the second process, the supplemental content.

Some implementations described herein relate to a non-transitory computer-readable medium that stores a set of instructions for using one or more inactive browser tabs. The set of instructions, when executed by one or more processors of a device, may cause the device to initiate a service in response to a command from a first process associated with a first browser tab. The set of instructions, when executed by one or more processors of the device, may cause the device to connect the service to a second browser tab in response to a request from a second process associated with the second browser tab. The set of instructions, when executed by one or more processors of the device, may cause the device to load, in the first browser tab and using the first process, a webpage. The set of instructions, when executed by one or more processors of the device, may cause the device to transmit, from the first process and to the service, an indication of supplemental content associated with the webpage. The set of instructions, when executed by one or more processors of the device, may cause the device to receive, by the second process and from the service, the indication of the supplemental content. The set of instructions, when executed by one or more processors of the device, may cause the device to load, in the second browser tab and using the second process, the supplemental content based on the indication of the supplemental content.

DETAILED DESCRIPTION

The following detailed description of example implementations refers to the accompanying drawings. The same reference numbers in different drawings may identify the same or similar elements.

Modern web browsers, such as Microsoft Edge®, Mozilla Firefox©, or Google Chrome®, among other examples, often allow a user to open multiple browser tabs. For example, the user may view multiple webpages simultaneously across the browser tabs. However, some browser tabs may be unused (e.g., captured by a blur event in JavaScript®) while the user scrolls, interacts with, or otherwise views a different browser tab (e.g., captured by a focus event in JavaScript). Some web browsers (e.g., Microsoft Edge and Google Chrome, among other examples) therefore place inactive browser tabs in a sleep state in order to conserve power and processing resources as well as to reduce memory overhead.

However, even if sleeping, an inactive browser tab may still be visible (e.g., not minimized and not fully covered by an active browser tab). As a result, power and processing resources are still wasted (e.g., at a graphics card and a display of a user device) in outputting the inactive browser tab.

Some implementations described herein enable use of an inactive (but at least partially visible) browser tab for supplemental content. For example, an active browser tab may output a webpage, and the inactive browser tab may output a multimedia file associated with the webpage. As a result, power and processing resources used to output the inactive browser tab (e.g., consumed by a graphics card and a display of a user device and/or by another type of output component of the user device) are efficiently used rather than wasted. For example, the supplemental content may reduce a need for a user to scroll the active browser tab in order to view more of the webpage, thus conserving power and processing resources at the user device.

Figure 1A:
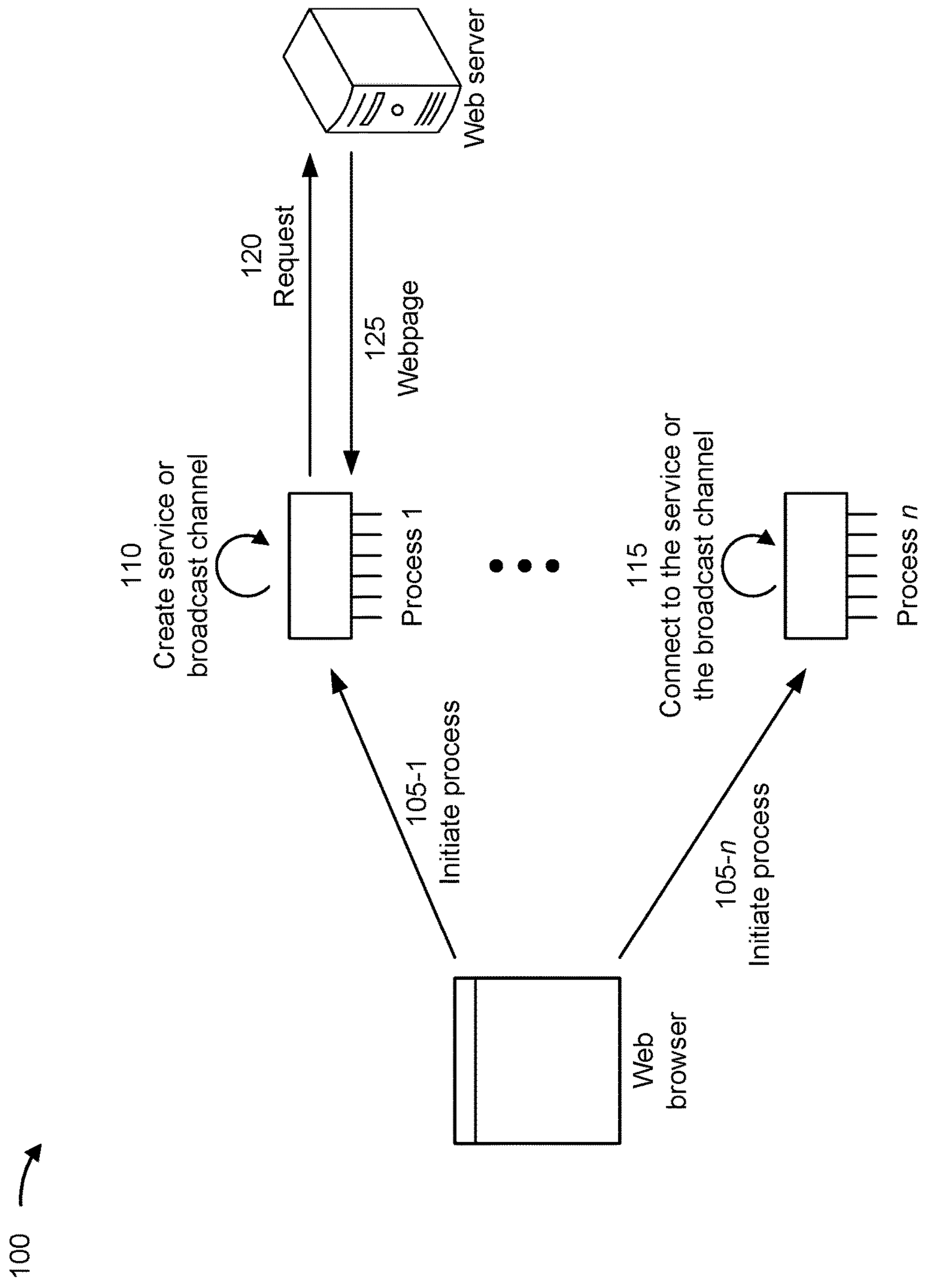
FIGS. 1A-1D are diagrams of an example implementation relating to web experience enhancement using inactive browser tabs, in accordance with some embodiments of the present disclosure.

FIGS. 1A-1D are diagrams of an example 100 associated with web experience enhancement using inactive browser tabs. As shown in FIGS. 1A-ID, example 100 includes a web browser (e.g., executed by a user device), a web server, and a content source. These devices are described in more detail in connection with FIGS. 3 and 4.

As shown in FIG. 1A and by reference numbers 105-1 through **105-*n*, the web browser may initiate a plurality of processes. For example, the web browser may initiate n processes, where n represents an integer greater than 1 (e.g., greater than or equal to 2). Therefore, in FIGS. 1A-1**D, "Process 1" through "Process n" are used to label the plurality of processes. Each process is an instance of (at least a portion of) the web browser. For example, a process may fetch content (e.g., and thus may include an instance of a network interaction program) and/or render content (e.g., and thus may include an instance of a web rendering engine) for a corresponding browser tab of the web browser. Additionally, in some implementations, a process may include an instance of a plug-in executable for the web browser (e.g., a portable document format (pdf) rendering engine, among other examples).

In some implementations, the plurality of processes may be associated with a plurality of browser tabs (of the web browser). The processes and the browser tabs may correspond on a one-to-one basis. For example, each process (in the plurality of processes) may correspond to a unique browser tab in the plurality of browser tabs. Additionally, or alternatively, the processes and the browser tabs may correspond on a many-to-one basis. For example, each browser tab (in the plurality of browser tabs) may be associated with two or more processes in the plurality of processes. Additionally, or alternatively, the processes and the browser tabs may correspond on a one-to-many basis. For example, each process (in the plurality of processes) may be associated with two or more browser tabs in the plurality of browser tabs.

As shown by reference number 110, the user device may create a broadcast channel in response to a command from a first process (shown as "Process 1") associated with a first browser tab. For example, the broadcast channel may be represented by a BroadcastChannel object in JavaScript (or another similar type of object provided by a library, an inter-process communication (IPC) system, or a rendering engine of the web browser, among other examples).

In some implementations, the first process may perform a first call to an application programming interface (API) and may include, as an argument, a name associated with the broadcast channel. For example, the API may be a constructor associated with a Broadcast Channel API in JavaScript (or another similar type of object provided by a library, an IPC system, or a rendering engine of the web browser, among other examples). The first call to the API may trigger creation of the broadcast channel.

Additionally, or alternatively, as shown by reference number 110, the user device may initiate a service in response to a command from the first process associated with the first browser tab. For example, the service may be referenced by a ServiceWorker object in JavaScript (or another similar type of object provided by a library, an IPC system, or a rendering engine of the web browser, among other examples) that connects the first browser tab to the service. In some implementations, the first process may activate the service (e.g., using an activate event for a Service Worker API in JavaScript) and may generate a first object (e.g., a ServiceWorker object in JavaScript) that connects the first browser tab to the service (e.g., by registering the object to the first browser tab, thus associating the first browser tab to the object via a scriptURL variable in JavaScript).

As shown by reference number 115, the user device may connect the broadcast channel to a second browser tab in response to a request from a second process (shown as "Process n") associated with the second browser tab. As described above, the broadcast channel may be represented by a BroadcastChannel object in JavaScript (or another similar type of object provided by a library, an IPC system, or a rendering engine of the web browser, among other examples). In some implementations, the second process may perform a second call to the API and may include, as an argument, the name associated with the broadcast channel. For example, the API may be a constructor associated with a Broadcast Channel API in JavaScript (or another similar type of object provided by a library, an IPC system, or a rendering engine of the web browser, among other examples). The second call to the API may trigger connection of the broadcast channel to the second browser tab.

Additionally, or alternatively, as shown by reference number 115, the user device may connect the service to the second browser tab in response to a request from the second process associated with the second browser tab. As described above, the service may be referenced by a ServiceWorker object in JavaScript (or another similar type of object provided by a library, an IPC system, or a rendering engine of the web browser, among other examples) that connects the second browser tab to the service. In some implementations, the second process may associate the same object (e.g., a ServiceWorker object in JavaScript) that connects the first browser tab to the service with the second browser tab as well. Alternatively, the second process may generate a second object (e.g., a ServiceWorker object in JavaScript) that connects the second browser tab to the service (e.g., by registering the second object to the second browser tab, thus associating the second browser tab to the second object via a scriptURL variable in JavaScript).

As shown by reference number 120, the user device may transmit, and the web server may receive, a request for a webpage. As shown in FIG. 1A, the first process may transmit the request (e.g., via the web browser and/or an operating system (OS) of the user device). Additionally, or alternatively, a main process of the web browser may transmit the request (e.g., via the OS of the user device). The request may include a hypertext transfer protocol (HTTP) request. In some implementations, a user of the user device may provide input (e.g., via an input component of the user device) that triggers the first process (and/or the main process of the web browser) to transmit the request. The input may indicate a uniform resource locator (URL). The web host may be associated with the URL. For example, the user device may resolve the URL (e.g., using a domain name service (DNS) or another type of service) such that the request is addressed to an Internet protocol (IP) address associated with the web host.

As shown by reference number 125, the web server may transmit, and the user device may receive, the webpage. The web server may transmit, and the user device may receive, the webpage in response to the request from the user device. As shown in FIG. 1A, the first process may receive the webpage (e.g., via the web browser and/or the OS of the user device). Additionally, or alternatively, the main process of the web browser may receive the webpage (e.g., via the OS of the user device). The webpage may be included in an HTTP response. The webpage may include JavaScript code or another type of executable code. Additionally, the webpage may include hypertext markup language (HTML) code, cascading style sheets (CSS) code, and/or a multimedia file (e.g., an image file and/or a video file), among other examples.

Although the example 100 is described in connection with the user device communicating directly with the web host, other examples may include an intermediary device (e.g., at least one intermediary device). For example, the user device may communicate with the web server via one or more network nodes and/or routers (e.g., via the Internet backbone, among other examples) rather than communicating directly.

Figure 1B:
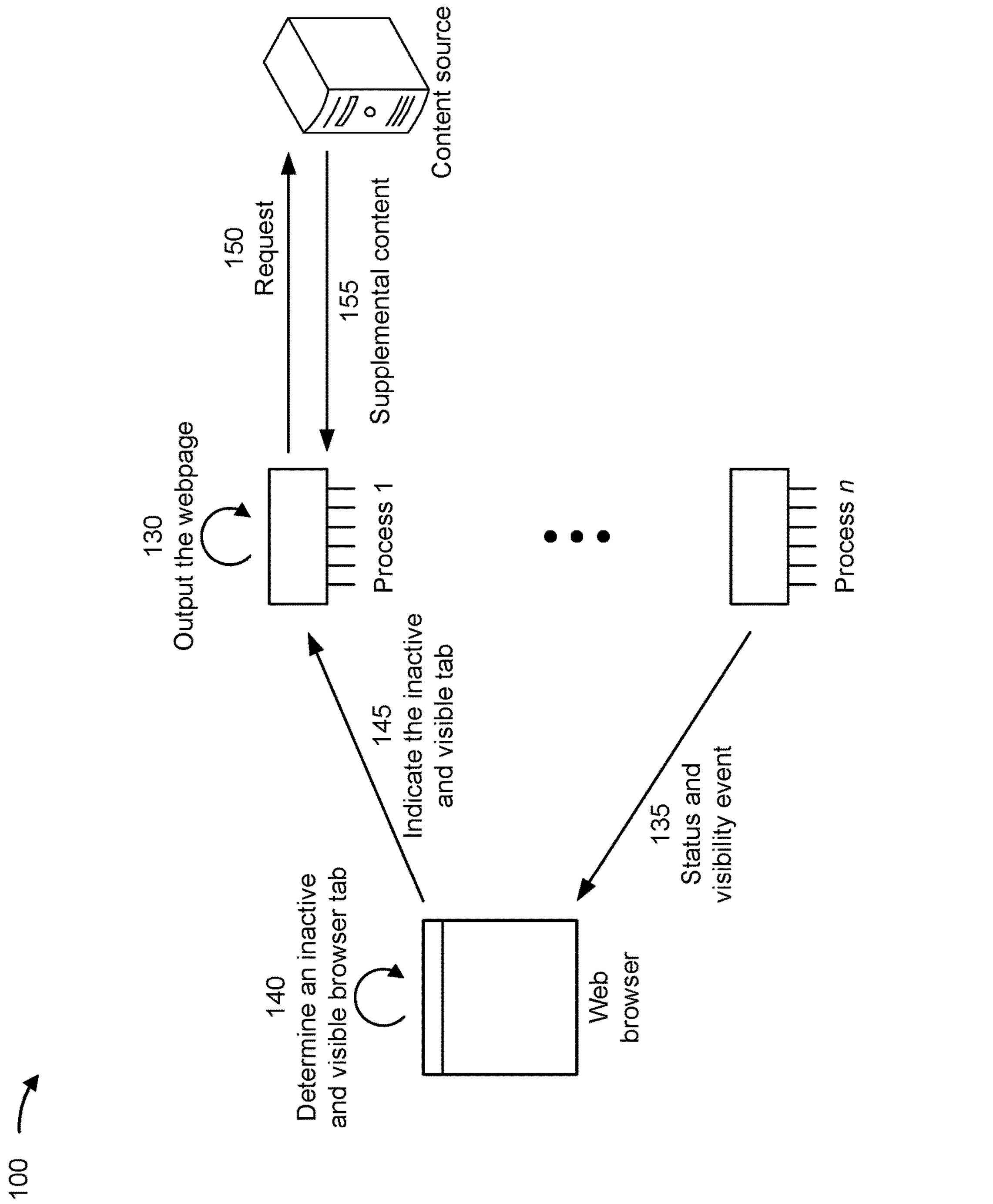
Figure 1C:
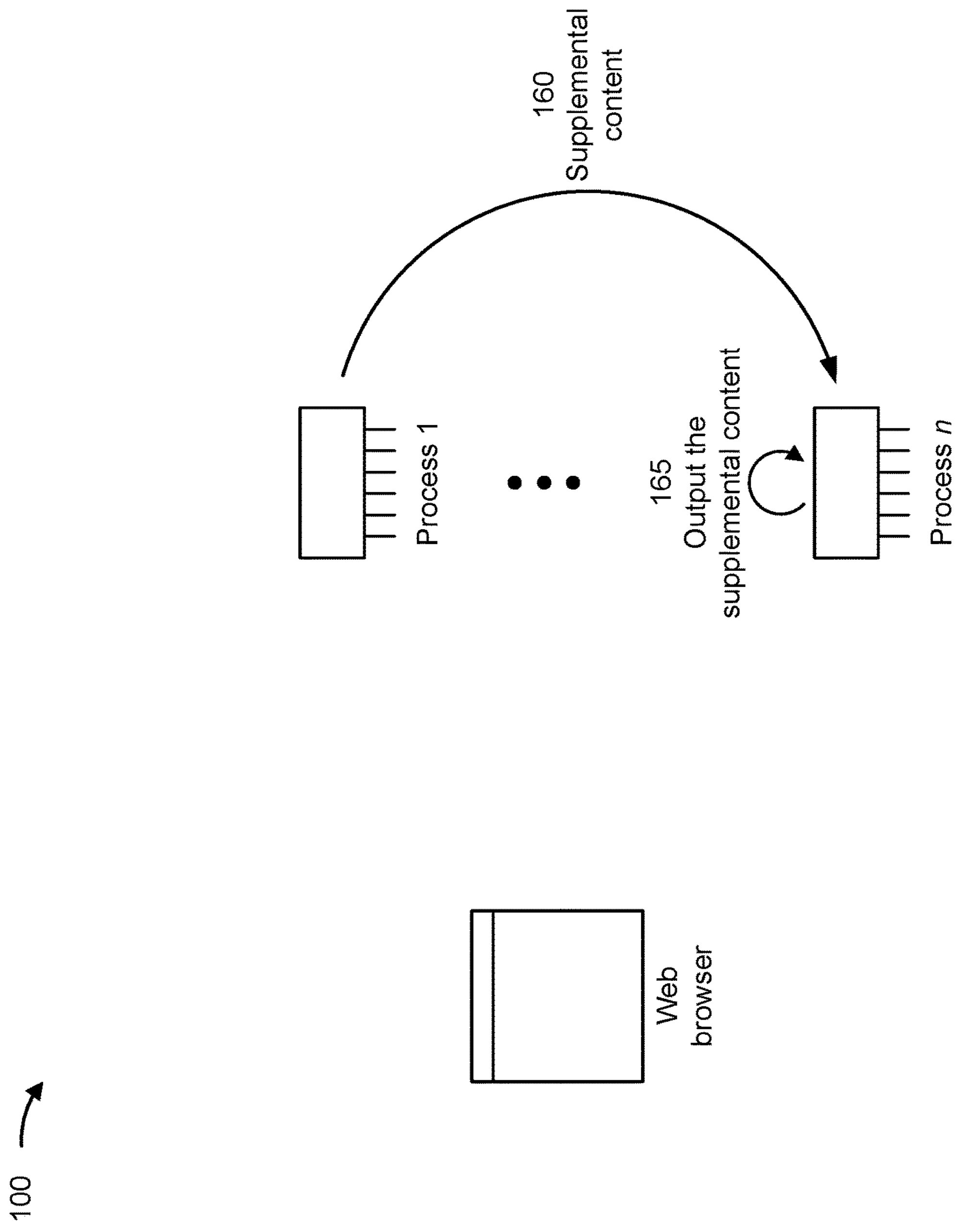

As shown in FIG. 1B and by reference number 130, the user device may output the webpage. For example, the user device may load the webpage, in the first browser tab, using the first process. The first process (and/or the main process of the web browser) of the user device may render the webpage. For example, style instructions (e.g., in an HTML file and/or a CSS file) may be processed along with any text and multimedia included in the webpage. Additionally, in some implementations, executable code in the webpage may be executed (e.g., by the first process and/or by the main process of the web browser) to obtain dynamic content for the webpage.

Although the example 100 is described in connection with client-side rendering, other examples may include server-side rendering. For example, executable code in the webpage may be executed by the web server, rather than the user device, to obtain dynamic content for the webpage. Therefore, the first process may receive HTML code (optionally with any CSS files and/or any multimedia files associated with the webpage) that the web server generated in order to encode the dynamic content for the webpage.

As shown by reference number 135, the second process may provide a status indicator and/or an indication of a visibility event (e.g., to the main process of the web browser). In some implementations, the second process may transmit, and the web browser may receive (e.g., at the main process) an indication of a visibility change (e.g., a visibilitychange event in JavaScript) associated with the second browser tab. The visibility change may indicate that the second browser tab is (at least partially) visible. For example, the web browser may determine that the second browser tab is (at least partially) visible based on the visibility change being a visible state in JavaScript. The visibility change would be a hidden state in JavaScript if the second browser tab were to be in the background, minimized, or associated with a powered off display of the user device.

Additionally, or alternatively, the second process may transmit, and the web browser may receive (e.g., at the main process) an indication of a blur event (e.g., a blur event in JavaScript) associated with the second browser tab. The blur event may indicate that the second browser tab is inactive. For example, the web browser may determine that the second browser tab is inactive based on the blur event. The second browser tab would be active if the second browser tab were to trigger a focus event instead (e.g., a focus event in JavaScript).

As shown by reference number 140, the web browser may determine that the second browser tab is associated with an inactive status. For example, the web browser may determine that the second browser tab is inactive based on a blur event. Additionally, or alternatively, the web browser may determine that the second browser tab is (at least partially) visible. For example, the web browser may determine that the second browser tab is (at least partially) visible based on a visibility event (e.g., detected via a Page Visibility API in JavaScript).

As shown by reference number 145, the web browser may indicate, to the first process, that the second browser tab is associated with an inactive status and/or is (at least partially) visible. Therefore, the first process may determine to load supplemental content associated with the webpage in the second browser tab. In some implementations, the determination may form a portion of the code used to instantiate the first process (e.g., the determination is coded into a network interaction program, a web rendering engine, or a plug-in executable, among other examples, that the first process is an instance of). Additionally, or alternatively, the determination may form a portion of code of the webpage (e.g., the determination is coded into JavaScript or another type of executable code received from the web server as part of the webpage). As shown in FIG. 1B, the first process makes the determination. Additionally, or alternatively, the main process of the web browser may make the determination.

Although the example 100 is described in connection with determining to use the second browser tab for the supplemental content, other examples may include additional browser tabs. For example, the first process may determine that a third browser tab is associated with an active status (e.g., based on an indication of a focus event associated with a third browser tab and received from a third process and/or the web browser). Accordingly, the web browser may refrain from loading supplemental content in the third browser tab based on the third browser tab being associated with the active status. Additionally, or alternatively, the first process may determine that a third browser tab is hidden (e.g., based on an indication of a visibility change associated with a third browser tab and received from a third process and/or the web browser). Accordingly, the web browser may refrain from loading supplemental content in the third browser tab based on the third browser tab being hidden. Additional browser tabs may be used to load the supplemental content (e.g., based on the additional browser tabs being inactive and/or at least partially visible) or to refrain from loading the supplemental content (e.g., based on the additional browser tabs being active and/or hidden).

As shown by reference number 150, the user device may transmit, and the web server may receive, a request for the supplemental content. As shown in FIG. 1B, the first process may transmit the request (e.g., via the web browser and/or the OS of the user device). Additionally, or alternatively, the main process of the web browser may transmit the request (e.g., via the OS of the user device). The request may include an HTTP request and/or an API call. In some implementations, code of the first process and/or the webpage may indicate a URL and/or an IP address associated with the content source. The web host may be associated with the URL. Therefore, the user device may address the request based on the URL and/or the IP address.

Although the example 100 shows the content source as (at least partially) separate from the web server (e.g., logically, physically, and/or virtually), other examples may include the content source integrated with the web server. For example, the web server may host the webpage as well as the supplement content associated with the webpage. Additionally, or alternatively, the web server may respond to HTTP requests for the webpage, as well as provision an API for retrieving the supplemental content.

As shown by reference number 155, the content source may transmit, and the user device may receive, the supplemental content. The content source may transmit, and the user device may receive, the supplemental content in response to the request from the user device. As shown in FIG. 1B, the first process may receive the supplemental content (e.g., via the web browser and/or the OS of the user device). Additionally, or alternatively, the main process of the web browser may receive the supplemental content (e.g., via the OS of the user device). The supplemental content may be included in an HTTP response and/or as a return from an API call. The supplemental content may include a multimedia file (e.g., at least one multimedia file) associated with the webpage (e.g., a set of images, as described in connection with FIGS. 2A-2B).

The example 100 is described in connection with the first process and/or the web browser making a determination to load the supplemental content and transmitting a request for the supplemental content based on the determination; however, other examples may include the content source making a determination to load the supplemental content and transmitting the supplemental content based on the determination. For example, the first process and/or (the main process of) the web browser may transmit, and the content source may receive, an indication that the second browser tab is inactive and/or (at least partially) visible. Accordingly, the content source may transmit, and the user device may receive (e.g., at the first process and/or the web browser), the supplemental content in response to the indication.

Additionally, or alternatively, the second process may make the determination to load the supplemental content. For example, the first process may transmit the supplemental content (or an indication of the supplemental content) to the broadcast channel and/or the service regardless of other browser tabs' statuses. Therefore, the other browser tabs (e.g., the second browser tab) may determine whether to render the supplemental content included in (or at least indicated in) a message from the broadcast channel and/or the service. For example, the second browser tab may, based on being inactive and (at least partially) visible, determine to load the supplemental content. Other browser tabs may ignore the supplemental content included in (or at least indicated in) the message from the broadcast channel and/or the service. For example, a third browser tab may, based on being active and/or hidden, determine to refrain from loading the supplemental content.

As shown in FIG. 2C by reference number 160, the first process may transmit, and the second process may receive, the supplemental content using the broadcast channel. For example, the first process may post a message, to the broadcast channel (e.g., using a postMessage( ) function in JavaScript), that includes the supplemental content. Accordingly, the second process may receive the supplemental content from the broadcast channel (e.g., by receiving a message event in JavaScript).

Additionally, or alternatively, the first process may transmit, and the second process may receive, the supplemental content using the service. For example, the first process may send a message, to the service (e.g., using a postMessage( ) function in JavaScript), that includes the supplemental content. Accordingly, the second process may receive the supplemental content from the service (e.g., by receiving a message event in JavaScript).

The supplemental content may include an image file (e.g., an ImageBitmap data structure in JavaScript), an audio file (e.g., an AudioData data structure in JavaScript), and/or another type of file (e.g., a File data structure in JavaScript).

As shown by reference number 165, the user device may output the supplemental content. For example, the user device may load the supplemental content, in the second browser tab, using the second process. The second process (and/or the main process of the web browser) of the user device may render the supplemental content. For example, style instructions (e.g., in an HTML file and/or a CSS file) may be processed along with any text and multimedia included in the supplemental content. Additionally, in some implementations, executable code in the supplemental content may be executed (e.g., by the second process and/or by the main process of the web browser) to obtain a dynamic portion of the supplemental content.

Although the example 100 is described in connection with client-side rendering, other examples may include server-side rendering. For example, executable code in the supplemental content may be executed by the content source, rather than the user device, to obtain the dynamic portion of the supplemental content. Therefore, the second process may receive HTML code (optionally with any CSS files and/or any multimedia files associated with the webpage) that the content source generated in order to encode the dynamic portion of the supplemental content.

Although the example 100 is described in connection with the first process transmitting the supplemental content using the broadcast channel and/or the service, other examples may include the first process transmitting an indication of the supplemental content using the broadcast channel and/or the service. For example, the first process may use a postMessage( ) function in JavaScript (or another similar function) to post the indication to the broadcast channel and/or to send the indication to the service. Accordingly, the second process may receive the indication from the broadcast channel and/or the service (e.g., by receiving a message event in JavaScript). The indication may include a filepath or an API endpoint associated with the supplemental content. Therefore, the second process may retrieve the supplemental content based on the indication. For example, the web browser may store the supplemental content in a file (e.g., at least one file), and the second process may receive the file encoding the supplemental content (e.g., using a getFile( ) function in JavaScript). In another example, the second process may transmit a request for the supplemental content to the content source (e.g., associated with the API endpoint and/or another type of identifier included in the indication) and may receive the supplemental content directly from the content source.

Figure 1D:
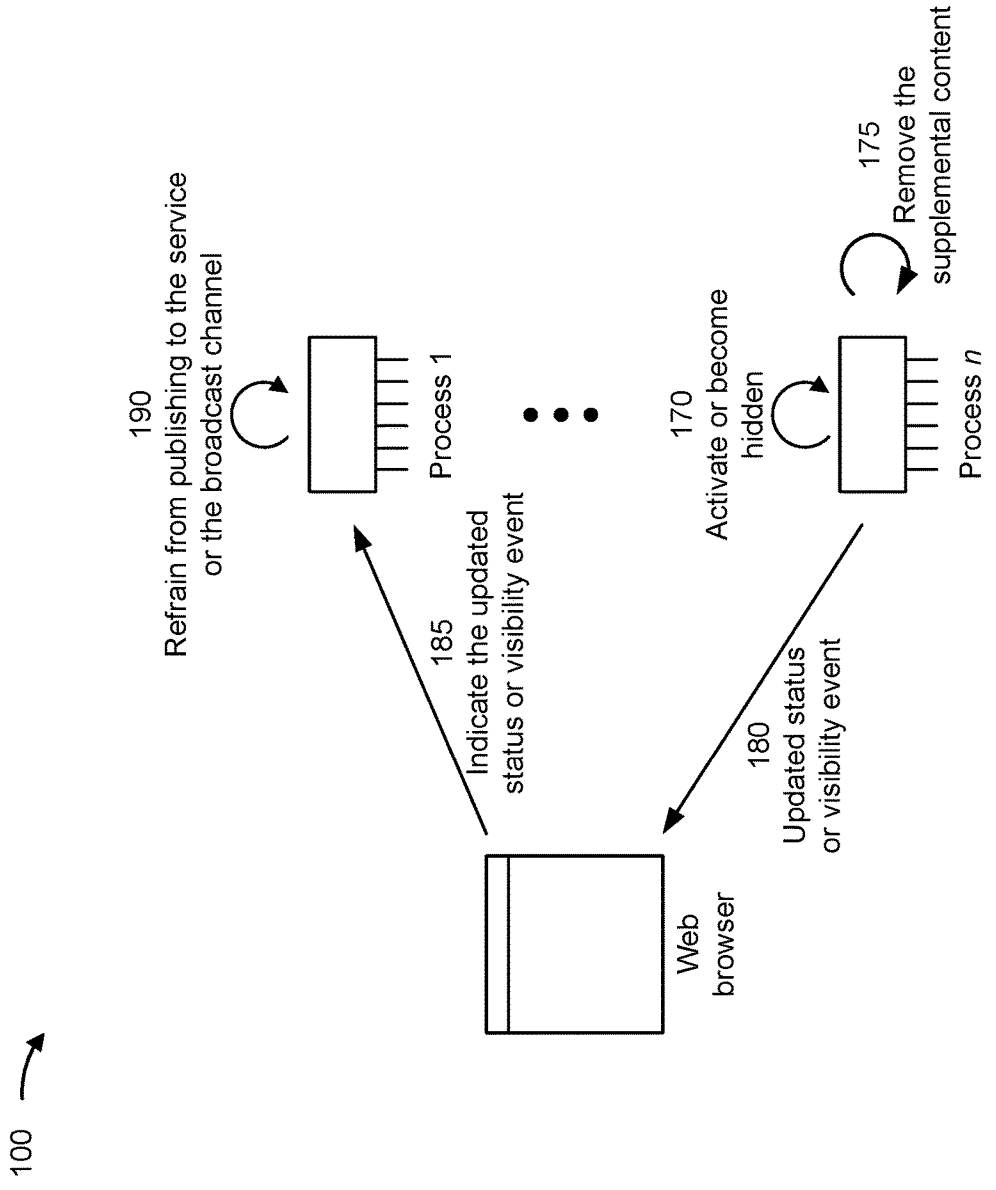

As shown in FIG. 1D and by reference number 170, the second browser tab may become active and/or hidden. For example, the user may click on or otherwise interact with the second browser tab in order to bring the second browser tab to the foreground. In another example, the user may trigger the user device to minimize or otherwise hide the second browser tab. In yet another example, a display (or another type of output component) of the user device may power off (e.g., due to a timer or an instruction from the user).

As shown by reference number 175, the user device may remove the supplemental content. For example, the user device may remove the supplemental content, from the second browser tab, using the second process. The user device may remove the supplemental content in response to a focus event associated with the second browser tab (e.g., the second browser tab being associated with an active status) or a visibility event associated with the second browser tab (e.g., the second browser tab being associated with a visibility change to hidden). The user device may output different content originally rendered in the second browser tab. For example, the user device may restore an original webpage, in the second browser tab, using the second process.

Additionally, in some implementations, the second process may notify (the main process of) the web browser. For example, as shown by reference number 180, the second process may provide an updated status indicator or an indication of a visibility event. In some implementations, the second process may transmit, and the web browser may receive (e.g., at the main process) an indication of a visibility change (e.g., a visibilitychange event in JavaScript) associated with the second browser tab. The visibility change may indicate that the second browser tab is hidden (e.g., by indicating a hidden state in JavaScript). Alternatively, the second process may transmit, and the web browser may receive (e.g., at the main process) an indication of a blur event (e.g., a blur event in JavaScript) associated with the second browser tab.

In turn, (the main process of) the web browser may provide the updated status indicator or the indication of the visibility event to the first process, as shown by reference number 185. Therefore, in some implementations, the first process may conserve power, processing resources, and memory resources by refraining from publishing supplemental content to the broadcast channel and/or the service, as shown by reference number 190.

By using techniques as described in connection with FIGS. 1A-1D, the user device uses the second browser tab for the supplemental content. For example, the webpage is output using the first browser tab, and the supplemental content associated with the webpage is output using the second browser tab. As a result, power and processing resources used to output the second browser tab (e.g., consumed by a graphics card and a display of a user device and/or by another type of output component of the user device) are efficiently used rather than wasted. For example, the supplemental content may reduce a need for the user to scroll the first browser tab in order to view more of the webpage, thus conserving power and processing resources at the user device.

As indicated above, FIGS. 1A-1D are provided as an example. Other examples may differ from what is described with regard to FIGS. 1A-1D.

Figure 2A:
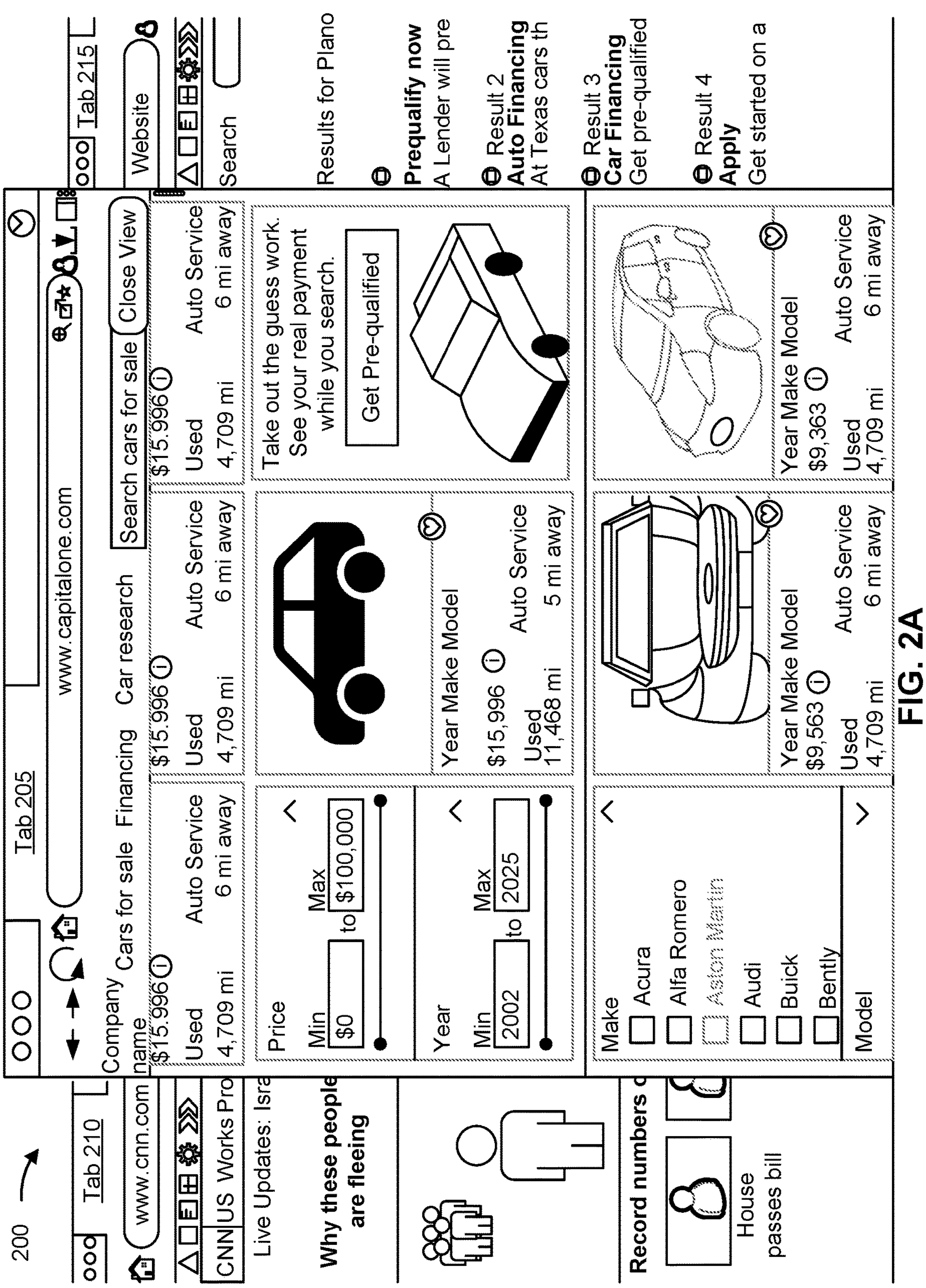
FIGS. 2A-2B are diagrams of a series of example user interfaces relating to using inactive browser tabs, in accordance with some embodiments of the present disclosure.
Figure 2B:
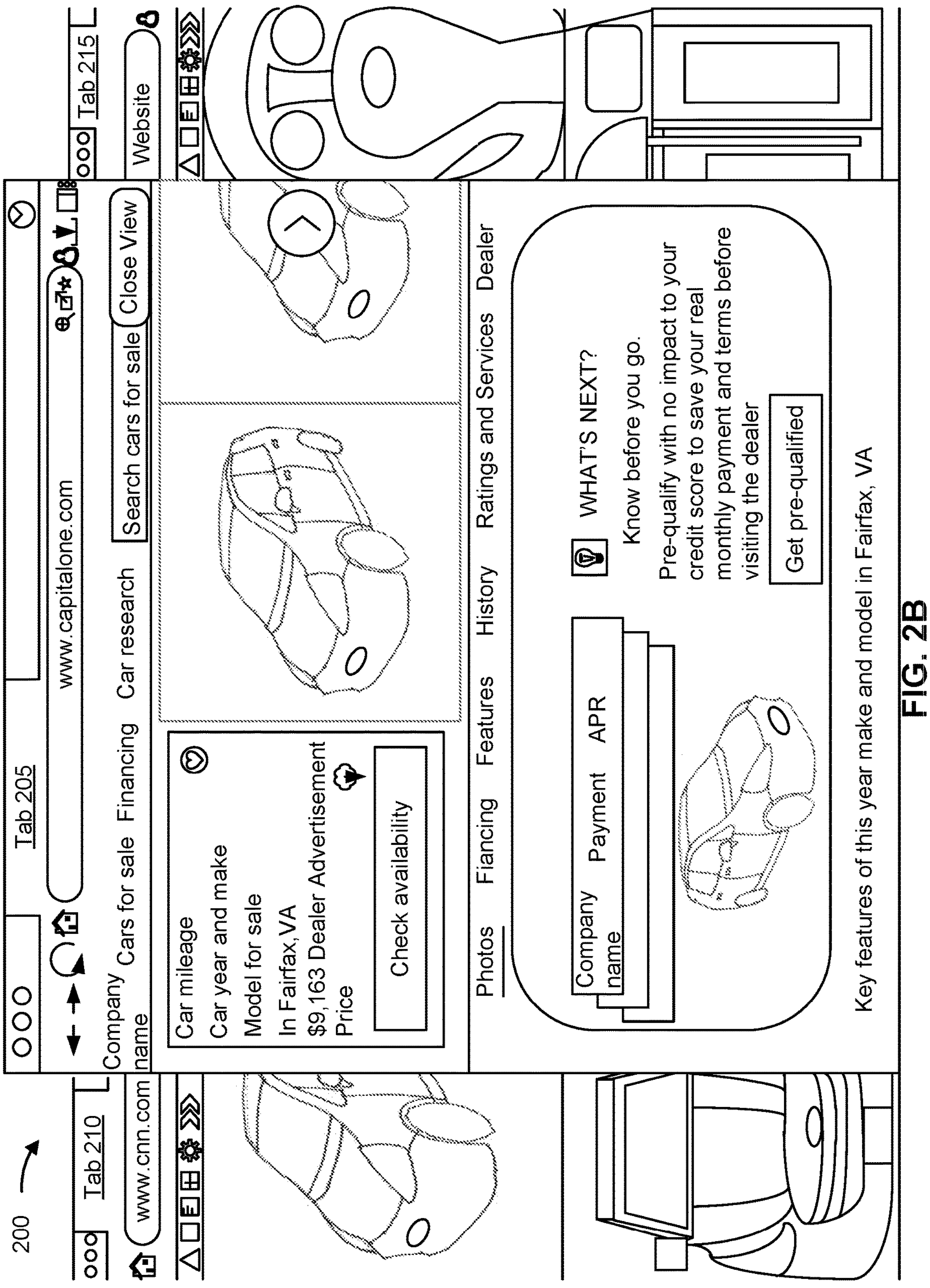

FIGS. 2A-2B are diagrams of a series 200 of example user interfaces (UIs) associated with using inactive browser tabs. The example UIs shown in FIGS. 2A-2B may be output by a user device based on instructions from a content source. These devices are described in more detail in connection with FIGS. 3 and 4.

As shown in FIG. 2A, an example UI may include a tab 205 that is active and visible. In FIG. 2A, the tab 205 is rendering a webpage related to a car search. FIG. 2A further includes a tab 210 and a tab 215 that are inactive but (at least partially) visible. In FIG. 2A, the tab 210 rendered a webpage related to news, and the tab 215 rendered a webpage related to an Internet search.

As a user browses the webpage in the tab 205, the user device may determine to use the tabs 210 and 215 to display supplemental content related to the webpage. For example, the user may interact with a result in the car search. Therefore, as shown in FIG. 2B, a process associated with the tab 205 may transmit the supplemental content (or at least an indication of the supplemental content) to a broadcast channel and/or a service. The tab 210 therefore receives the supplemental content (or at least the indication of the supplemental content) from the broadcast channel and/or the service and renders the supplemental content. In FIG. 2B, the supplemental content in the tab 210 comprises exterior images associated with the result in the car search. Similarly, the tab 215 receives the supplemental content (or at least the indication of the supplemental content) from the broadcast channel and/or the service and renders the supplemental content. In FIG. 2B, the supplemental content in the tab 215 comprises interior images associated with the result in the car search.

If the user were to power off a display (or another type of output component) of the user device, the tabs 210 and 215 would refrain from rendering the supplemental content. Similarly, if the user were to minimize the tab 210 (and/or the tab 215), the tab 210 (and/or the tab 215, respectively) would refrain from rendering the supplemental content. Furthermore, if the user were to make the tab 210 (or the tab 215) active, the tab 210 (or the tab 215, respectively) would refrain from rendering the supplemental content.

As indicated above, FIGS. 2A-2B are provided as an example. Other examples may differ from what is described with regard to FIGS. 2A-2B. For example, more than two inactive tabs may be used to output the supplemental content. Alternatively, a single inactive tab may be used to output the supplemental content.

Figure 3:
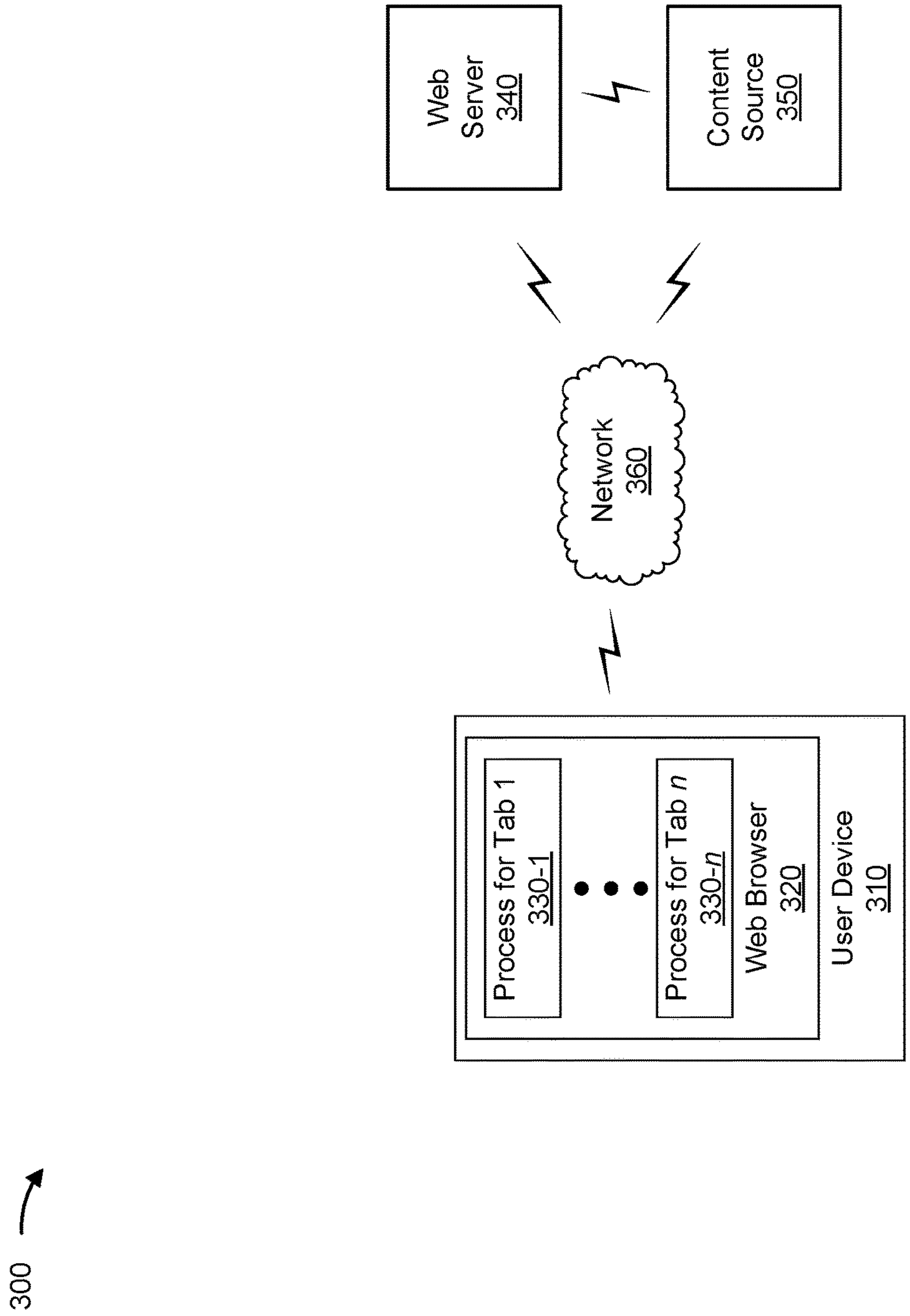
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a user device 310 that executes a web browser 320 (e.g., supported by an OS of the user device 310, which is not shown in FIG. 3), and a plurality of processes 330-1 through **330-*n* for a plurality of browser tabs 1 through n (e.g., initiated and supported by the web browser 320), as described in more detail below. The environment 300 may further include a web server 340 and a content source 350**.

The user device 310 may include a communication device. For example, the user device 310 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 310 may include an input component to facilitate interaction with a user. Example input components include a keyboard, a touchscreen, a microphone, and/or a mouse. The user device 310 may include an output component. Example output components include a display, a speaker, and/or a haptic vibrator.

The web browser 320 may include an executable capable of running on a user device 310. In some implementations, the web browser 320 may communicate with the web server 340 and/or the content source 350. For example, the web browser 320 may use an HTTP, a file transfer protocol (FTP), and/or another Internet- or network-based protocol to request information from, transmit information to, and receive information from the web server 340 and/or the content source 350. The web browser 320 may include a main process that is supported by an OS of the user device 310. The OS may include system software capable of managing hardware of the user device (which may include, for example, one or more components of device 400 of FIG. 4) and providing an environment for execution of higher-level software, such as the web browser 320. For example, the OS may include a kernel (e.g., a Windows-based kernel, a Linux kernel, a Unix-based kernel (such as an Android kernel), an iOS kernel, and/or another type of kernel) managing the hardware and library functions that may be used by the higher-level software. The OS may additionally provide a UI and process input from a user.

The web browser 320 may, in turn, instantiate and support the plurality of processes 330-1 through 330-*n*. Each process 330 may include an instance of a network interaction program (e.g., and thus communicate with the web server 340 and/or the content source 350), an instance of a web rendering engine for a corresponding browser tab, and/or an instance of a plug-in executable for the web browser 320. The main process of the web browser 320 may manage IPC between the main process and each process 330 (as well as among the plurality of processes 330-1 through 330-*n*, in some implementations).

The web server 340 may include one or more devices capable of receiving, generating, storing, processing, and/or providing information associated with webpages, as described elsewhere herein. The web server 340 may include a communication device and/or a computing device. For example, the web server 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The content source 350 may include one or more devices capable of receiving, generating, storing, processing, and/or providing information associated with supplemental content, as described elsewhere herein. The content source 350 may include a communication device and/or a computing device. For example, the content source 350 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

Devices and/or elements of environment 300 may interconnect via wired connections and/or wireless connections. For example, devices and/or elements of environment 300 may communicate via a network 360. The network 360 may include one or more wired and/or wireless networks. For example, the network 360 may include a wireless wide area network (e.g., a cellular network or a public land mobile network), a local area network (e.g., a wired local area network or a wireless local area network (WLAN), such as a Wi-Fi network), a personal area network (e.g., a Bluetooth® network), a near-field communication network, a telephone network, a private network, the Internet, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
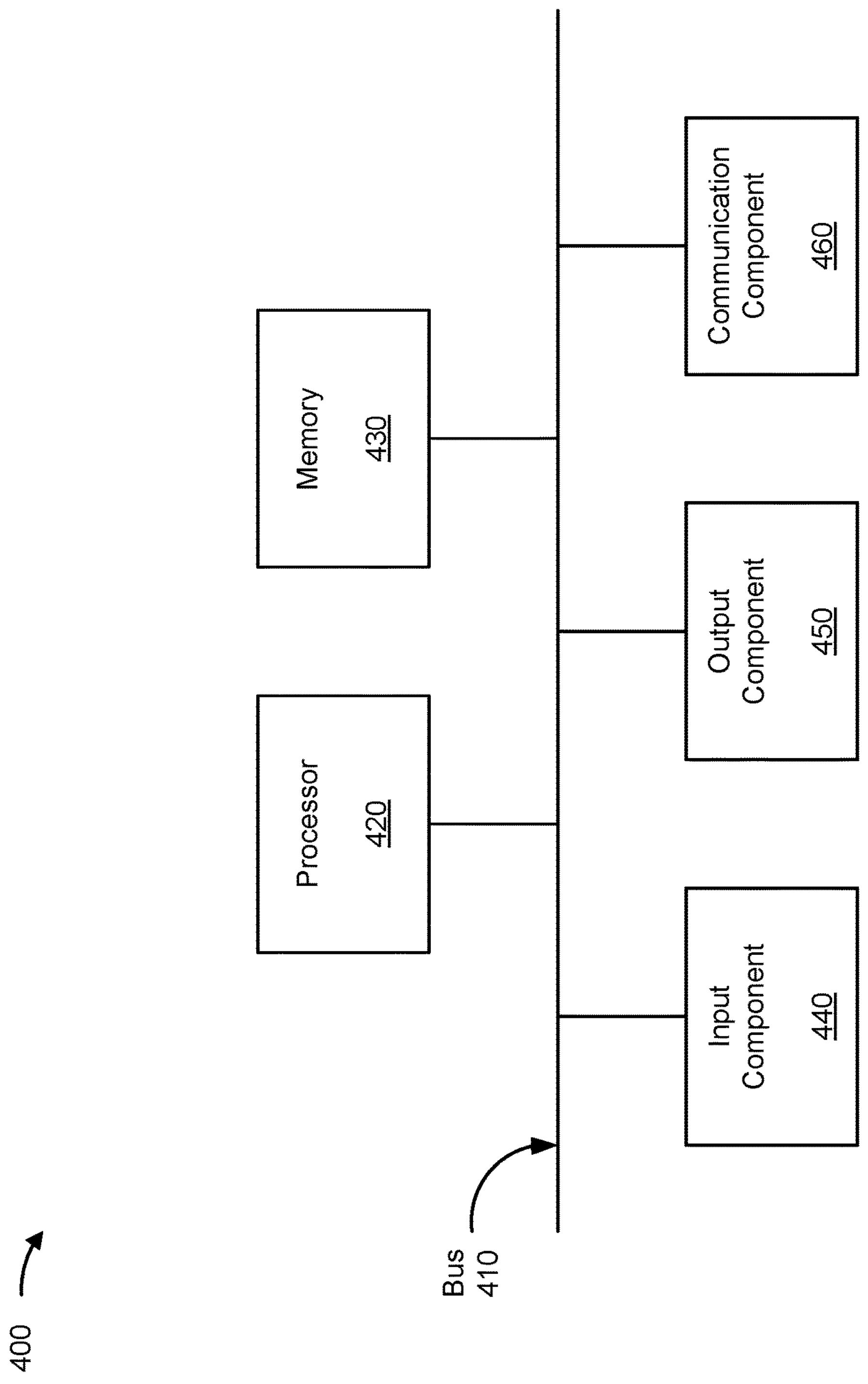
FIG. 4 is a diagram of example components of one or more devices of FIG. 3, in accordance with some embodiments of the present disclosure.

FIG. 4 is a diagram of example components of a device 400 associated with web experience enhancement using inactive browser tabs. The device 400 may correspond to a user device 310, a web server 340, and/or a content source 350. In some implementations, a user device 310, a web server 340, and/or a content source 350 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection).

The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
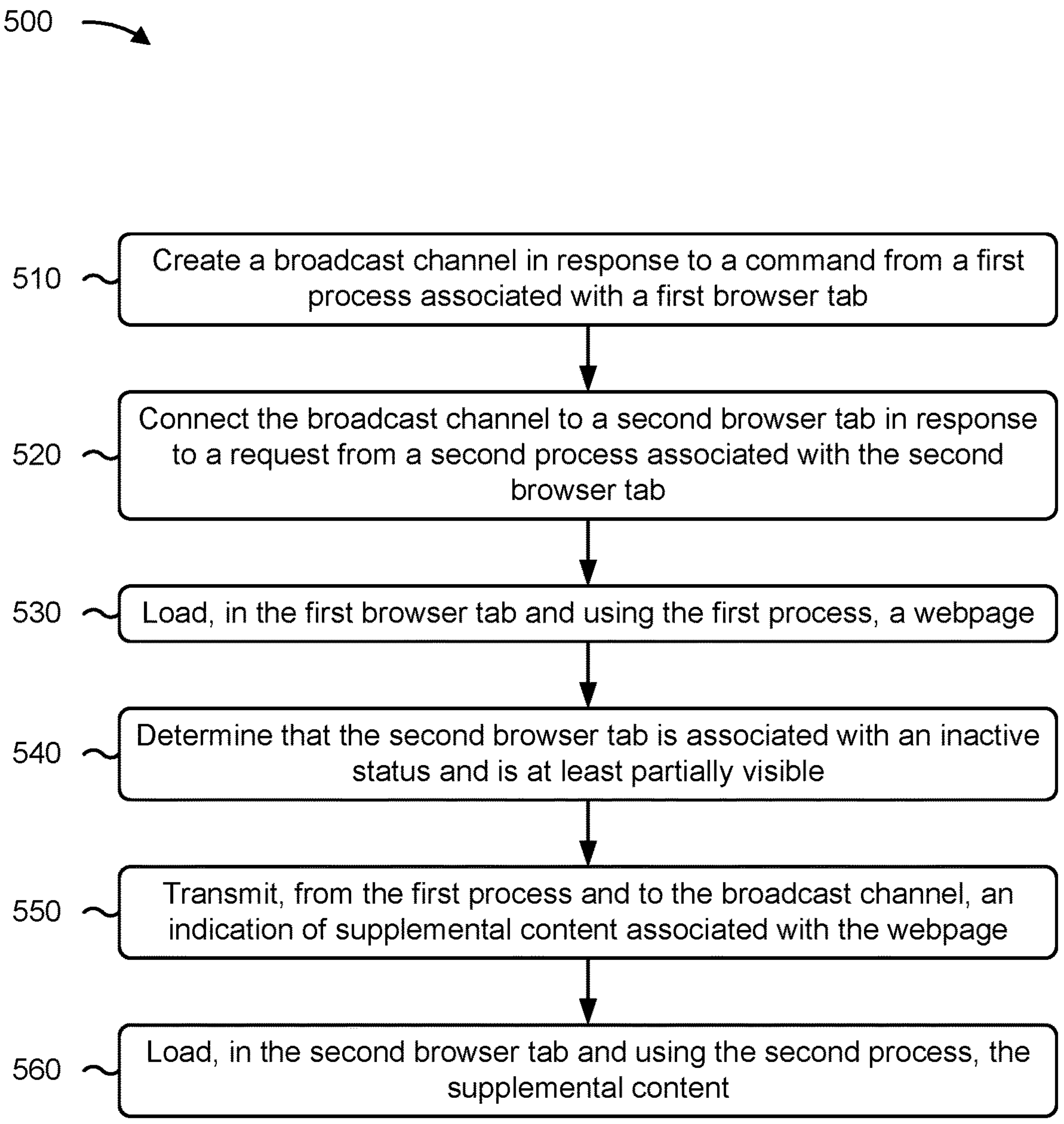
FIGS. 5-6 are flowcharts of example processes relating to web experience enhancement using inactive browser tabs, in accordance with some embodiments of the present disclosure.

FIG. 5 is a flowchart of an example process 500 associated with web experience enhancement using inactive browser tabs. In some implementations, one or more process blocks of FIG. 5 may be performed by a user device 310. In some implementations, one or more process blocks of FIG. 5 may be performed by another device or a group of devices separate from or including the user device 310, such as a web server 340 and/or a content source 350. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include creating a broadcast channel in response to a command from a first process associated with a first browser tab (block 510). For example, the user device 310 (e.g., using processor 420 and/or memory 430) may create a broadcast channel in response to a command from a first process associated with a first browser tab, as described above in connection with reference number 110 of FIG. 1A. As an example, the user device 310 may perform a first call to an API (e.g., a constructor associated with a Broadcast Channel API in JavaScript) and may include, as an argument, a name associated with the broadcast channel. The first call to the API may trigger creation of the broadcast channel.

As further shown in FIG. 5, process 500 may include connecting the broadcast channel to a second browser tab in response to a request from a second process associated with the second browser tab (block 520). For example, the user device 310 (e.g., using processor 420 and/or memory 430) may connect the broadcast channel to a second browser tab in response to a request from a second process associated with the second browser tab, as described above in connection with reference number 115 of FIG. 1A. As an example, the user device 310 may perform a second call to the API (e.g., the constructor associated with a Broadcast Channel API in JavaScript) and may include, as an argument, the name associated with the broadcast channel. The second call to the API may trigger connection of the broadcast channel to the second browser tab. For example, using the same name in the second call to the API as in the first call may result in the first browser tab and the second browser tab being associated with the same broadcast channel.

As further shown in FIG. 5, process 500 may include loading, in the first browser tab and using the first process, a webpage (block 530). For example, the user device 310 (e.g., using processor 420 and/or memory 430) may load, in the first browser tab and using the first process, a webpage, as described above in connection with reference number 130 of FIG. 1B. As an example, the first process (and/or a main process of a web browser) of the user device 310 may render the webpage.

As further shown in FIG. 5, process 500 may include determining that the second browser tab is associated with an inactive status and is at least partially visible (block 540). For example, the user device 310 (e.g., using processor 420 and/or memory 430) may determine that the second browser tab is associated with an inactive status and is at least partially visible, as described above in connection with reference number 140 of FIG. 1B. As an example, the user device 310 may determine that the second browser tab is associated with the inactive status based on a blur event. Additionally, or alternatively, the user device 310 may determine that the second browser tab is at least partially visible based on a visibility event (e.g., detected via a Page Visibility API in JavaScript).

As further shown in FIG. 5, process 500 may include transmitting, from the first process and to the broadcast channel, an indication of supplemental content associated with the webpage (block 550). For example, the user device 310 (e.g., using processor 420 and/or memory 430) may transmit, from the first process and to the broadcast channel, an indication of supplemental content associated with the webpage, as described above in connection with reference number 160 of FIG. 1C. As an example, the indication may include a filepath or an API endpoint associated with the supplemental content. Therefore, the second process may retrieve the supplemental content based on the indication (e.g., by receiving at least one file encoding the supplemental content and/or by requesting the supplemental content directly from a content source).

As further shown in FIG. 5, process 500 may include loading, in the second browser tab and using the second process, the supplemental content (block 560). For example, the user device 310 (e.g., using processor 420 and/or memory 430) may load, in the second browser tab and using the second process, the supplemental content, as described above in connection with reference number 165 of FIG. 1C. As an example, the second process (and/or a main process of a web browser) of the user device 310 may render the supplemental content.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D and/or FIGS. 2A-2B. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

Figure 6:
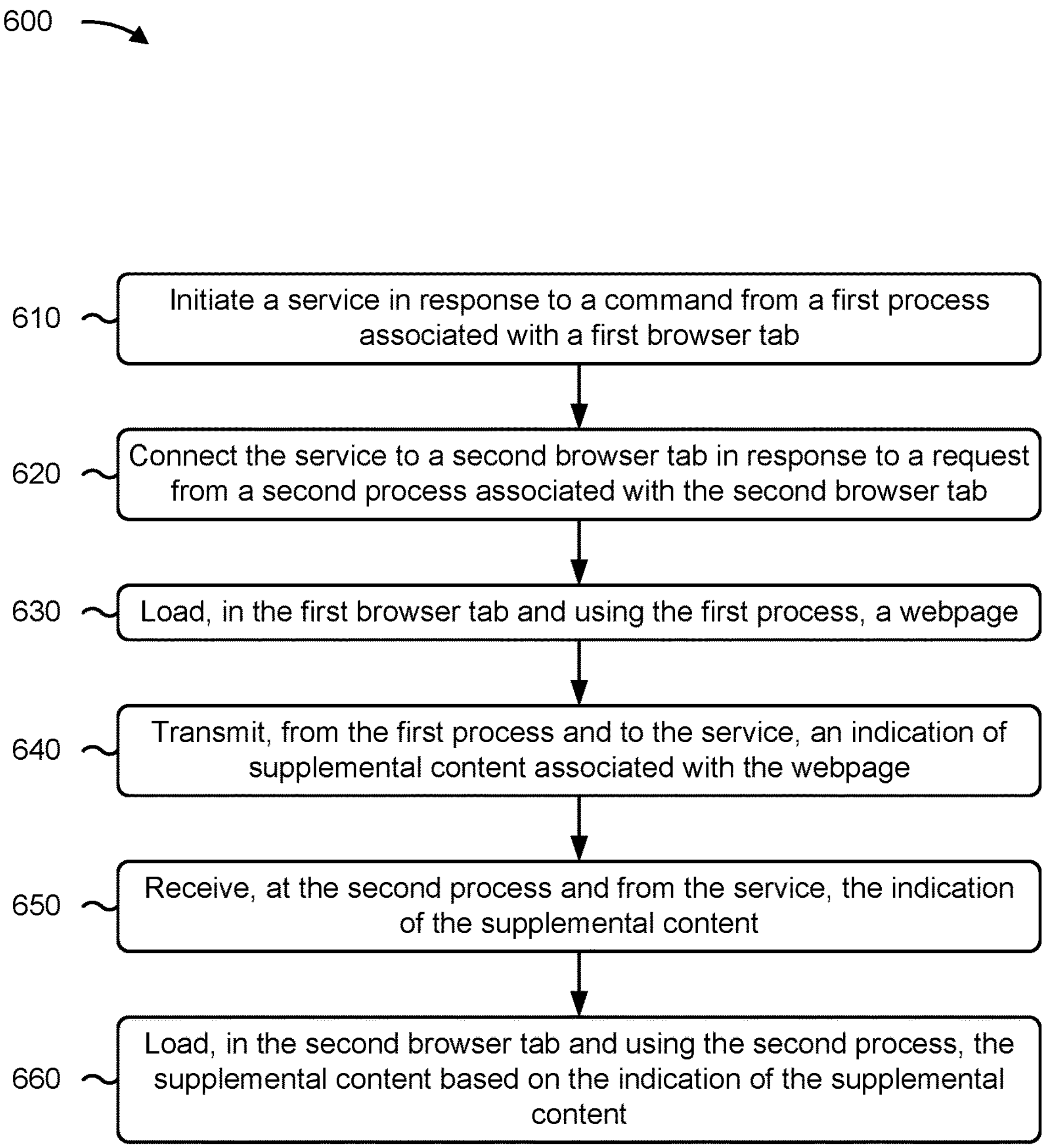

FIG. 6 is a flowchart of an example process 600 associated with web experience enhancement using inactive browser tabs. In some implementations, one or more process blocks of FIG. 6 may be performed by a user device 310. In some implementations, one or more process blocks of FIG. 6 may be performed by another device or a group of devices separate from or including the user device 310, such as a web server 340 and/or a content source 350. Additionally, or alternatively, one or more process blocks of FIG. 6 may be performed by one or more components of the device 400, such as processor 420, memory 430, input component 440, output component 450, and/or communication component 460.

As shown in FIG. 6, process 600 may include initiating a service in response to a command from a first process associated with a first browser tab (block 610). For example, the user device 310 (e.g., using processor 420 and/or memory 430) may initiate a service in response to a command from a first process associated with a first browser tab, as described above in connection with reference number 110 of FIG. 1A. As an example, the user device 310 may activate the service (e.g., using an activate event for a Service Worker API in JavaScript) and may generate a first object (e.g., a ServiceWorker object in JavaScript) that connects the first browser tab to the service (e.g., by registering the object to the first browser tab, thus associating the first browser tab to the object via a scriptURL variable in JavaScript).

As further shown in FIG. 6, process 600 may include connecting the service to a second browser tab in response to a request from a second process associated with the second browser tab (block 620). For example, the user device 310 (e.g., using processor 420 and/or memory 430) may connect the service to a second browser tab in response to a request from a second process associated with the second browser tab, as described above in connection with reference number 115 of FIG. 1A. As an example, the user device 310 may associate the same object (e.g., a ServiceWorker object in JavaScript) that connects the first browser tab to the service with the second browser tab as well. Alternatively, the user device 310 may generate a second object (e.g., a ServiceWorker object in JavaScript) that connects the second browser tab to the service (e.g., by registering the second object to the second browser tab, thus associating the second browser tab to the second object via a scriptURL variable in JavaScript).

As further shown in FIG. 6, process 600 may include loading, in the first browser tab and using the first process, a webpage (block 630). For example, the user device 310 (e.g., using processor 420 and/or memory 430) may load, in the first browser tab and using the first process, a webpage, as described above in connection with reference number 130 of FIG. 1B. As an example, the first process (and/or a main process of a web browser) of the user device 310 may render the webpage.

As further shown in FIG. 6, process 600 may include transmitting, from the first process and to the service, an indication of supplemental content associated with the webpage (block 640). For example, the user device 310 (e.g., using processor 420 and/or memory 430) may transmit, from the first process and to the service, an indication of supplemental content associated with the webpage, as described above in connection with reference number 160 of FIG. 1C. As an example, the indication may include a filepath or an API endpoint associated with the supplemental content.

As further shown in FIG. 6, process 600 may include receiving, at the second process and from the service, the indication of the supplemental content (block 650). For example, the user device 310 (e.g., using processor 420 and/or memory 430) may receive, at the second process from the service, the indication of the supplemental content, as described above in connection with reference number 160 of FIG. 1C. As an example, the second process may retrieve the supplemental content based on the indication (e.g., by receiving at least one file encoding the supplemental content and/or by requesting the supplemental content directly from a content source).

As further shown in FIG. 6, process 600 may include loading, in the second browser tab and using the second process, the supplemental content based on the indication of the supplemental content (block 660). For example, the user device 310 (e.g., using processor 420 and/or memory 430) may load, in the second browser tab and using the second process, the supplemental content based on the indication of the supplemental content, as described above in connection with reference number 165 of FIG. 1C. As an example, the second process (and/or a main process of a web browser) of the user device 310 may render the supplemental content.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1D and/or FIGS. 2A-2B. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for using one or more inactive browser tabs, the system comprising:

one or more memories; and one or more processors, communicatively coupled to the one or more memories, configured to:

create a broadcast channel in response to a command from a first process associated with a first browser tab;

connect the broadcast channel to a second browser tab in response to a request from a second process associated with the second browser tab;

load, in the first browser tab and using the first process, a webpage;

determine that the second browser tab is associated with an inactive status and is at least partially visible;

transmit, from the first process and to the broadcast channel, an indication of supplemental content associated with the webpage; and load, in the second browser tab and using the second process, the supplemental content.

2. The system of claim 1, wherein the one or more processors are configured to:

transmit, to a web server, a first request;

receive, from the web server, the webpage in response to the first request;

transmit, to the web server, a second request; and receive, from the web server, the supplemental content in response to the second request.

3. The system of claim 1, wherein the one or more processors, to determine that the second browser tab is associated with the inactive status, are configured to:

receive an indication of a blur event associated with the second browser tab, wherein the inactive status associated with the second browser tab is determined based on the indication of the blur event.

4. The system of claim 1, wherein the one or more processors are configured to:

receive an indication of a focus event associated with a third browser tab;

determine that the third browser tab is associated with an active status based on the indication of the focus event; and refrain from loading the supplemental content in the third browser tab based on the third browser tab being associated with the active status.

5. The system of claim 1, wherein the one or more processors, to determine that the second browser tab is at least partially visible, are configured to:

receive an indication of a visibility change associated with the second browser tab, wherein the second browser tab is determined to be at least partially visible based on the indication of the visibility change.

6. The system of claim 1, wherein the one or more processors are configured to:

receive an indication of a visibility change associated with a third browser tab;

determine that the third browser tab is hidden based on the indication of the visibility change; and refrain from loading the supplemental content in the third browser tab based on the third browser tab being hidden.

7. The system of claim 1, wherein the indication of supplemental content comprises a filepath or an application programming interface endpoint.

8. A method of using one or more inactive browser tabs, comprising:

creating, by a user device, a broadcast channel in response to a command from a first process associated with a first browser tab;

connecting, by the user device, the broadcast channel to a second browser tab in response to a request from a second process associated with the second browser tab;

receiving, from a web server, a webpage for the first browser tab;

transmitting, to the web server, an indication that the second browser tab is inactive;

receiving, from the web server and in response to the indication, supplemental content associated with the webpage;

transmitting, via the broadcast channel and to the second process, an indication of the supplemental content; and loading, in the second browser tab and using the second process, the supplemental content.

9. The method of claim 8, wherein the supplemental content includes at least one multimedia file associated with the webpage.

10. The method of claim 8, wherein creating the broadcast channel comprises:

performing a first call to an application programming interface (API) and including, as an argument, a name associated with the broadcast channel.

11. The method of claim 10, wherein connecting the broadcast channel to the second browser tab comprises:

performing a second call to the API and including, as an argument, the name associated with the broadcast channel.

12. The method of claim 8, wherein the supplemental content is received from the web server by the second process.

13. The method of claim 8, wherein the supplemental content is received via the broadcast channel by the second process.

14. The method of claim 8, wherein the indication of supplemental content comprises a filepath or an application programming interface endpoint.

15. A non-transitory computer-readable medium storing a set of instructions for using one or more inactive browser tabs, the set of instructions comprising:

one or more instructions that, when executed by one or more processors of a device, cause the device to:

initiate a service in response to a command from a first process associated with a first browser tab;

connect the service to a second browser tab in response to a request from a second process associated with the second browser tab;

load, in the first browser tab and using the first process, a webpage;

transmit, from the first process and to the service, an indication of supplemental content associated with the webpage;

receive, by the second process and from the service, the indication of the supplemental content; and load, in the second browser tab and using the second process, the supplemental content based on the indication of the supplemental content.

16. The non-transitory computer-readable medium of claim 15, wherein the one or more instructions, when executed by the one or more processors, cause the device to:

receive an indication of a focus event associated with the second browser tab; and remove the supplemental content from the second browser tab in response to the focus event.

17. The non-transitory computer-readable medium of claim 15, wherein the one or more instructions, that cause the device to initiate a service, cause the device to:

activate the service; and generate a first object, associated with the first browser tab, that connects the first browser tab to the service.

18. The non-transitory computer-readable medium of claim 15, wherein the one or more instructions, that cause the device to connect the service to the second browser tab, cause the device to:

generate a second object, associated with the second browser tab, that connects the second browser tab to the service.

19. The non-transitory computer-readable medium of claim 15, wherein the one or more instructions, that cause the device to connect the service to the second browser tab, cause the device to:

associate an object for the service with the second browser tab, wherein the object is further associated with the first browser tab.

20. The non-transitory computer-readable medium of claim 15, wherein the one or more instructions, when executed by the one or more processors, cause the device to:

receive an indication of a visibility change associated with second browser tab; and remove the supplemental content from the second browser tab in response to the visibility change.

* * * * *